United States Patent [19]

Harke et al.

[11] Patent Number: 5,753,741
[45] Date of Patent: May 19, 1998

[54] CASTING COMPOSITION

[75] Inventors: Stefan Harke, Sinsheim-Rohrbach; Stephanie Grathwohl, Oberderdingen; Klaus Hock, Regan; Rudolf Paternoster, Rinchnach; Werner Fenzl, Regan; Norbert Fenten, Elsdorf, all of Germany

[73] Assignees: Blanco GmbH & Co. KG, Oberderdingen; Schock & Co. GmbH, Schorndorf, both of Germany

[21] Appl. No.: 859,815

[22] Filed: May 19, 1997

Related U.S. Application Data

[63] Continuation of PCT/EP95/04618, Nov. 23, 1995.

[30] Foreign Application Priority Data

Jan. 10, 1995 [EP] European Pat. Off. ............ 95100273

[51] Int. Cl.⁶ ............................................. C08K 3/00
[52] U.S. Cl. ................................... 524/494; 523/217
[58] Field of Search ............................ 523/217; 524/494

[56] References Cited

FOREIGN PATENT DOCUMENTS

| 4304494 | 8/1994 | Germany . |
| 4304494A1 | 8/1994 | Germany . |
| 9310182 | 5/1993 | WIPO . |
| WO 93/10182 | 5/1993 | WIPO . |

*Primary Examiner*—Edward J. Cain
*Attorney, Agent, or Firm*—Edward J. Timmer

[57] ABSTRACT

In a casting composition comprising a curable syrup which contains a liquid monomer and polymer components optionally dissolved therein, and an inorganic filler which includes a quartz sand product, in order to simplify the production of white molded articles, it is proposed that a product, the individual grain of which consists in the core essentially of quartz and at the surface essentially of α-cristobalite (low-temperature modification) be selected as quartz sand product.

16 Claims, 1 Drawing Sheet

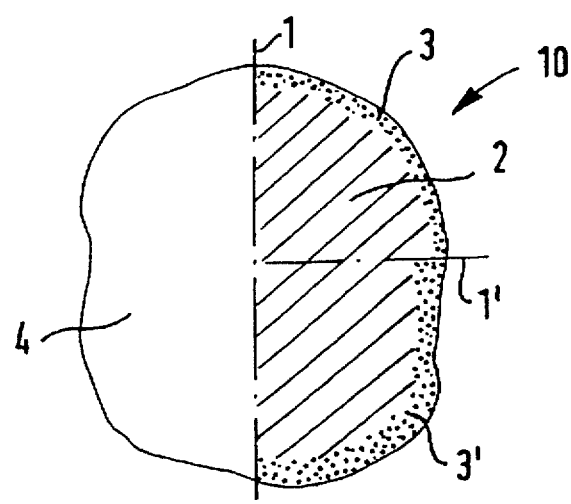

CASTING COMPOSITION

This is a continuation of international PCT application No. PCT/EP95/04618 having international filing date of Nov. 23, 1995, which designates the United States.

The present disclosure relates to the subject matter disclosed in International Application PCT/EP95/04618, International Publication No. WO 96/16089, of Nov. 23, 1995, the entire specification of which is incorporated herein by reference.

The invention relates to a casting composition comprising a curable syrup which contains a liquid monomer and optionally polymer components dissolved therein, and an inorganic filler which includes a quartz sand product.

Such casting compositions are known from the prior art, e.g., from DE-OS 24 49 656. The casting compositions are used, inter alia, for producing plastic molded articles for bathrooms or kitchens, in particular for kitchen sinks, counter-tops and sanitary ware such as, e.g., bathtubs, shower troughs, etc.

As high as possible a volume content of hard, coarse-grained fillers is used to produce from such casting compositions white molded articles which are also to be scratch-resistant. A cristobalite sand with a grain size distribution in the range of 200 to 500 µm with filler concentrations in the molded article of approximately 62% by weight is preferred. With the use of α-cristobalite (low-temperature modification) as filler, on the one hand, a very high degree of whiteness is achieved with an embedding of the filler in the polymethyl methacrylate (referred to hereinbelow as PMMA), which is due, inter alia, to the very favorable refraction index of the cristobalite sand in view of the PMMA matrix.

On the other hand, disadvantages of use of α-cristobalite sand are the relatively large coefficient of expansion of this inorganic filler and its porosity, which withdraws liquid monomer very rapidly in the syrup of the casting composition in the castable state and thus leads to a premature thickening of the casting composition.

This results not only in difficult handling of the casting composition, i.e., the standing time of the fully mixed casting composition is relatively short, and in a castability of the composition which deteriorates very rapidly due to the thickening effect, but also, on account of the high coefficient of expansion of the α-cristobalite sand, in a pronounced tendency to form cracks upon exposure to temperature changes in the finished molded articles. This creates particular problems, especially since the molded articles for kitchens and bathrooms are frequently subjected to temperature changes, e.g. when the molded articles are subsequently exposed to hot and cold water.

As white molded articles, e.g., kitchen sinks, bathtubs, etc. still have a very high rank in kitchens and bathrooms, it is desirable to have a casting composition available for the production of white molded articles which is easier to handle than that known from the prior art, but, on the other hand, exhibits a comparable whiteness.

This requirement is met by a casting composition of the kind described at the outset in that it contains in accordance with the invention a quartz sand product, the individual grain of which consists in the core essentially of quartz and on the surface essentially of α-cristobalite.

Surprisingly, it is found that with the use of such quartz sand products as inorganic filler, firstly, a stability of the dispersion of the casting composition is achievable which permits processing within a period of 72 hours and for a considerable time beyond that, without the casting composition exhibiting any significant tendency to thicken during this time.

Furthermore, molded articles are obtainable from such casting compositions which, owing to the inventive choice of the filler, which still largely consists of quartz material with a low coefficient of expansion, exhibit good resistance to cracking upon exposure to changes in temperature.

The inventive quartz sand product used also exhibits a whiteness comparable with the α-cristobalite sand, has a high color neutrality and also shows a good resistance to staining after exposure to abrasion. These characteristics are of importance particularly when the casting compositions are used for the production of molded articles for kitchens, where exposure to abrasion, e.g., of the kitchen sinks or countertops, frequently occurs, and the lack of these positive characteristics can very quickly lead to a soiled appearance of the molded article. This is highly detrimental to the marketability of such products.

As mentioned above, the quartz sand product used in accordance with the invention does not consist solidly of α-cristobalite, but instead has a layer of α-cristobalite only at the surface of the grain and in the interior still consists of quartz.

In the production of α-cristobalite, β-quartz is converted, as a rule, using mineralizers, e.g., monovalent cations such as $Na^+$, at temperatures above 1450° C. into α-cristobalite. The mineralizers have a favorable effect on the structural conversion of the β-quartz, and the conversion takes place throughout the entire volume of the quartz grain and usually requires a dwell time at 1500° C. of approximately 5 hours.

With the formation of the α-cristobalite in this way a drastic decrease is obtained in the density of the granular material from approximately 2.65 g/cm$^3$ of the β-quartz to approximately 2.35/cm$^3$ of the newly formed α-cristobalite. Visually speaking, it can be ascertained that the material swells to some extent, thereby causing the quartz sand grains to break into splinter-like fragments, or if a grain does not break, at least crack structures leading into the interior of the grains develop and impart a cracked, fissured surface to the grains. The material thereby becomes porous and when used as filler in the casting compositions described at the outset absorbs liquid monomer, which leads to a thickening of the casting composition.

The conversion of the quartz material occurring with a decrease in the density or increase in the specific volume takes place only at the surface of the quartz sand product used in accordance with the invention, but to a considerable quantitative extent as a genuine change in structure there, while the core remains practically unchanged as quartz. Tensile stresses are thereby avoided at the surface. In the case of a solid conversion right into the core, these cannot be eliminated when the conversion progresses from the outside inwards and the increase in the specific volume in the interior attempts to drive the outer layers which have already been converted further apart.

In accordance with the invention, a quartz sand product is used in which the density or the specific volume of the core of the individual grain does not change, and the structural change in the surface regions results at the most in compressive stresses there, which, in general, however, do not cause crack formation.

Also, in the production of the quartz sand product to be used in accordance with the invention, the rounded surface structure of the quartz sand is essentially maintained, which justifies an optimal filler function, as does the pure white color of the product. In view of the high degree of whiteness, the quartz sand product to be used in accordance with the invention thus possesses the advantages of the α-cristobalite, without having its disadvantages in the form of the highly disordered surface, the larger coefficient of expansion, etc.

Quartz sand products preferred as fillers contain an α-cristobalite proportion in the total grain of on average approximately 1 to 25% by weight, with 3 to 15% by weight, for example, approximately 10% by weight, being further preferred.

In the production of the quartz sand product to be used in accordance with the invention, care is preferably taken to ensure that the grain retains its smooth, intact surface to a considerable extent. With this preferred formation of the quartz sand product, not only is an impairment of the castability of the syrup mixed with the filler minimized to as great an extent as possible, and its castability stabilized for relatively long periods of time, but, in addition, the resistance to staining is improved, as the grain surface located at the surface or exposed to the surface due to scratching has only a minimal capacity for absorbing liquids which cause staining such as, e.g., tea, coffee, various juices, etc.

The quartz sand product is preferably used with a grain size distribution which is relatively coarse for casting compositions, with a predominance in the range of approximately 100 μm to approximately 500 μm. This choice of grain size distribution is made in view of the desired scratch-resistance of a molded article manufactured from the casting composition.

A quartz sand product with an essentially unbroken grain shape is preferred. This again improves the stain-resistance of the finished molded articles manufactured from the casting composition according to the invention.

A quartz sand product with a degree of whiteness of >60, measured as L-value in accordance with German industrial standard 55981, in relation to the prescribed standard of whiteness is preferred. For cristobalite sand, an L-value of approximately 80 is obtained. Further preferred are quartz sand products which, measured in accordance with German industrial standard 55981, have as a-value the absolute value ≦0.6, preferably ≦0.2, as b-value the absolute value ≦2.0, preferably ≦1.2, and hence a color tinge with approximately 2 or less, preferably approximately 1.2 or less, as s-value. Slight deviations from the color "pure white" can be covered over by additions of small amounts of a conventional white pigment to the casting composition, (e.g. $TiO_2$, for example, type 2200 of the Kronos Titan company, Leverkusen) and the molded plastic article, in particular the molded PMMA plastic article, can thus be raised to the desired degree of whiteness.

In view of good impact strength of the molded articles to be manufactured and their improved stain-resistance, the quartz sand product is preferably used in silanized form (cf., e.g. DE-OS 23 04 602).

In the method for the production of the aforementioned quartz sand products to be used in accordance with the invention, the α-quartz (low quartz) serving as initial material, which is present above 573° C. as β-quartz (high quartz), is calcined at 1150° to 1250° C. material temperature in a furnace suitable for the high-temperature treatment of fine-grained mineral materials, e.g. a revolving tubular furnace or a fluidized-bed furnace. The layer thickness during the conversion into α-cristobalite can be controlled via the dwell time. To promote the conversion at the relatively low temperature of 1150° to 1250° C., the quartz sand must be provided beforehand, i.e. before the calcination, with a mineralizer.

Since thorough conversion into α-cristobalite is not to take place, the heat treatment time lies by at least one order of magnitude below the known heat treatment times, which, of course, is advantageous from the point of view of power requirement.

The natural quartz sand often contains dark particles owing to mineral additives, in particular, containing ferric oxide, which are undesired from the point of view of color. On account of the lower temperatures prevailing in the present method, these particles are not completely molten, as in the case of complete conversion into α-cristobalite, and in this way removed from the remaining cristobalite composition. Surprisingly, it has, however, been found that the dark particles can also be easily removed in the present method, more specifically, by a simple classification procedure following the calcination procedure. For, the mineral additives which cause the dark color simultaneously have an eutectic effect and cause such a grain to start to melt earlier than "clean" quartz grains. Therefore, quite large, baked grain aggregates form in the vicinity of such a dark grain and can be separated by the classification, whereby the number of dark particles in the quartz sand product can be significantly reduced and its whiteness considerably improved.

Therefore, the quartz sand product to be used in accordance with the invention still has the grain size distribution of the quartz sand used, i.e., of the initial material, and still has the rounded grain contour of the quartz sand, also no fissured surface, on account of the classification and separation of the dark particles only very few detrimental dark places, on account of the cristobalite formation at the surface a high degree of whiteness and essentially still the low thermal coefficient of expansion of the quartz, in particular in comparison with α-cristobalite.

In particular, it is advantageous in the production of the quartz sand products to be used in accordance with the invention to ensure that by the partial conversion of the quartz into α-cristobalite, conversion of the individual grain is only carried out to such an extent that the capillary volume and pore volume accessible from outside remain as small as possible.

The proportion of the inorganic filler to be used can be 40 to 90% by weight of the casting composition.

The inorganic filler can be formed entirely by the quartz sand product according to the invention or, surprisingly, half of it can be replaced by conventional α-cristobalite sand, with all of the positive characteristics obtained with use of the quartz sand product to be used in accordance with the invention for the handling of the casting composition and for the characteristics of the molded article finally produced being essentially fully maintained.

BRIEF DESCRIPTION OF THE DRAWING

The FIGURE is an elevational view, partially sectioned, of a grain of a quartz sand product.

The invention will be explained in further detail hereinbelow with reference to the drawing, which, as a single FIGURE, contains a diagrammatic illustration of a grain of a quartz sand product to be used in accordance with the invention in a casting composition, in part-sectional representation, and with reference to the following examples.

The grain, designated in its entirety by reference numeral 10 in the figure, of a quartz sand product to be used in accordance with the invention is cut open on the right of line 1, where it reveals a core 2 of β-quartz which at the surface is converted into layered regions 3, 3' of α-cristobalite. The conversion has taken place by calcination of the quartz sand in the revolving tubular furnace for approximately 15 minutes at a material temperature of 1150° to 1250° C. The initial quartz sand was mixed beforehand with a mineralizer in the form of an aqueous or other solution of $Na^+$ ions which spread uniformly over the grain surface and accelerate the conversion of the quartz sand present at 1150° to 1250° C. as β-quartz into cristobalite at relatively low temperatures. The thickness of the regions 3 and 3', respectively, can be controlled via the dwell time of the thus treated initial quartz sand in the revolving tubular furnace. The region 3 is relatively thin in structure above line 1', below line 1' it is thicker. The aim is for the proportion of β-quartz converted into cristobalite to be approximately 10% by weight, as, in this case, on the one hand, a very good degree of whiteness is achieved, and, on the other hand, as much grain volume as possible remains in the quartz modification.

The surface 4 of the grain 10 is represented on the left of line 1. It does contain certain irregularities on a large scale, but otherwise is intact and smooth and essentially shows no cracks or crevices.

The results of comparative tests which indicate the advantages of the quartz sand product according to the invention are shown in the following Table I.

TABLE I

| Characteristics | Crude sand | Inventive quartz sand product | M72 cristobalite sand |
|---|---|---|---|
| Standard color value Y according to German industrial standard 5033 powder charge | 52 | 80 | 85 |
| Standard color value Y according to German industrial standard 5033 PMMA tablet | 30 | 75 | 80 |
| Water absorption g/100 g | 28 | 35 | 50 |
| Grain distribution | | | |
| >500 μ | 1 | 4 | 3 |
| 500–355 μm | 5 | 6 | 12 |
| 355–125 μm | 93 | 89 | 86 |
| <125 μm | 1 | 1 | 1 |

Untreated quartz sand is normally to be understood by "crude sand" or initial quartz sand. In the "quartz sand product to be used in accordance with the invention", the conversion into α-cristobalite has taken place at the surface, more specifically, in such a way that the proportion of the α-cristobalite present at the surface is approximately 10% of the total quartz weight. The proportion of the α-cristobalite in the grain volume can be very easily ascertained, for example, with the X-ray structure analysis as powder diagram.

The "M72 cristobalite sand" is a product which has been converted throughout into α-cristobalite in a long heat treatment and has a cracked, fissured surface.

The "standard color value" Y according to German industrial standard 5033 is a color measurement value which has proven useable in practice for comparison of various sand-like products with respect to their whiteness.

To determine the values of the whiteness, a PMMA tablet with a filler content of 60% by weight was produced as test article and measured in accordance with German industrial standard 5033.

The grain distribution was measured in an Alpine air jet screen.

The Table shows that the degree of whiteness of the inventive quartz sand product lies considerably above that of the normal quartz sand, but only slightly below that of the M72 cristobalite sand. The latter is still somewhat whiter than the inventive quartz sand product, but, on the other hand, it has a considerably higher water absorption, which is due to the creviced, porous surface. The water absorption characterizes the suitability of the product as filler, in particular in synthetic resin systems, because it is also a measure of the binder component which is withdrawn from the syrup by the filler. The inventive quartz sand product thus unites a high degree of whiteness, in particular in plastic bonded form, which is comparable with the M72 cristobalite sand, with a clearly lower water absorption, in comparison with the same M72 cristobalite sand.

Casting composition according to the invention

As α-cristobalite sand was used as filler in the prior art casting compositions comparable with the casting compositions according to the invention, a very intense and very long-lasting increase in the viscosity of the casting compositions is observed therein as the cracks, crevices, pores, capillaries, etc. present therein constantly continue to absorb binder from the syrup. The permeation of the binder, in particular of the liquid monomer is, however, important in these casting compositions in order that the molded articles obtained will later exhibit at least a certain resistance to soiling due to at least the cavities formed by the capillary pores of the binder grains being filled at least by the binder and thereby closed and soiling which cannot be removed owing to inaccessibility being prevented from being permanently trapped in these.

Owing to the increase in the viscosity observed in the prior art, only relatively low filler contents in the casting compositions and hence in the molded articles obtained from these are possible, and, in particular with filler contents of 69 or even 72% by weight, regulated, reproducible processability is no longer possible.

The "white" casting composition according to the invention, on the other hand, produces white molded articles which are resistant to scratches and stains. At the same time, these molded articles exhibit good resistance to alternate exposure to hot and cold water.

The inventive casting composition also exhibits a long standing time without any noticeable changes in viscosity occurring during this time. In particular, the casting composition is producible with a high filler content and yet still lends itself extremely reliably and well to processing.

In the casting compositions according to the invention, a filler content of 64% by weight or more is preferred, further preferred are filler contents of at least 70% by weight and especially preferred are filler contents of 73% by weight. Even the casting compositions with filler contents of 73% by weight lend themselves well to processing, as their viscosity can be set without any problem at less than 80 Pa*s, <60 Pa*s being preferred and <50 Pa*s especially preferred. Over a period of at least one hour the casting compositions according to the invention exhibit no change in the viscosity, and even over a period of 4 hours and more, no or no noticeable increase in viscosity is observed. Furthermore, the inventive casting composition provides the possibility of preparing special mixtures whose viscosity remains constant over a period of even several days.

The aforementioned advantages are due to the use of the quartz sand product described above, which, in the grain exhibits a conversion of less than 30% by weight cristobalite at the surface, with up to 20% by weight being further preferred, and the range of 5 to 15% by weight being especially preferred. Intrinsically, these materials already have an excellent degree of whiteness, which clearly differs from that of a natural grey-beige quartz sand. They exhibit a whiteness which almost corresponds to that of the cristobalite sand and, at any rate, is adequate for the manufacture of so-called "white" molded articles.

The syrup composition can be varied within wide limits, with the monomer preferably being formed by an acrylate and/or methacrylate monomer and the optionally used prepolymer component preferably being formed from the same material. Of course, many polyester and other polymer compounds such as are known for the manufacture of molded articles for kitchens and bathrooms are also suitable.

In general, a great number of casting compositions can be used, and, by way of example only, reference is made to DE-OS 24 49 656. The syrup contains the initiators important for the curing of the casting composition, and, here, too, reference can be made to the two aforementioned prior art publications.

For the comparative consideration of the characteristics of the α-cristobalite, the ACQ quartz sand product to be used in accordance with the invention and a quartz from the prior art (DE-AS 22 41 712, referred to hereinbelow as Dorfner quartz) the following casting composition formulations are used:

a) To produce an α-cristobalite reference sample, the following mixture is made:

200 g PMMA (LP 51/03 type of the Degussa company) are dissolved in 800 g technical MMA (Degussa company). 1670 g M72 cristobalite sand are added to this "prepolymer syrup". 16 g of a conventional peroxidic initiator (bis(-t-butyl-cyclohexyl)-peroxodicarbonate) are then also added. The composition is cured in the usual way between two glass plates in a water bath at 60° C., with a spacing of 4 cm between the glass plates. From the cured sample (time requirement for the curing approximately 30 minutes) the color of the sample is determined with a commercially available color measuring apparatus (Minolta CR 200). For this purpose, the so-called LAB system (color space) according to German industrial standard 55981 is used, and this sample is used as reference quantity for determining the so-called color tinge s in comparison with the other filler samples.

The measuring method according to German industrial standard 55981 produces an L-value as gray value; an a-value as red-green value, which, in the case of positive values, shows a red tone, and, in the case of negative a-values a green tone, b-values or so-called yellow-blue values, which show a yellow tone as positive b-value and a blue tone as negative b-value.

The results for the sample described above are given in Table II.

TABLE II

|  | α-cristobalite | ACQ | Dorfner quartz a) | Dorfner quartz b) |
|---|---|---|---|---|
| Thermal coefficient of expansion (3–100° C.) |  |  |  |  |
| 10⁻⁶ (m/mK) | 50 | 13 | 12 | 12. |
| density (g/cm³) | 2.3 | 2.6 | 2.6 | 2.6 |

TABLE II-continued

|  | α-cristobalite | ACQ | Dorfner quartz a) | Dorfner quartz b) |
|---|---|---|---|---|
| L-value | 86.7 | 71.8 | 74.4 | 81.18 |
| a-value | −0.60 | −0.09 | 1.97 | 1.27 |
| b-value | −0.50 | 1.08 | 5.31 | 5.13 |
| s-value | 0.80 | 1.1 | 5.7 (YR) | 5.3 (YR) |
| Grain shape | round-edged, very cracked structure | round, smooth surface | round-edged, smooth surface | round-edged, smooth surface |
| Impact strength of PMMA sample | extremely bad | very good–good | very good–good | very good–good |
| Scratch-resistance | very good | very good | very good | very good |
| Stain-resistance | bad | very good | very good | very good |

Kitchen sinks manufactured from this material have the following characteristics:

Extremely bad impact strength, very good scratch-resistance, but, in turn, bad resistance to stains. The casting compositions produced exhibit a viscosity which increases strongly with time and continues to increase over a long time.

b) ACQ sample and Dorfner quartz sample

This formulation results in the same volume content of a filler as the aforementioned formulation, with the different density of the quartz of 2.6 in relation to 2.3 of α-cristobalite being taken into consideration. 200 g PMMA (LP 51/03 type of the Degussa company) are dissolved in 800 g technical MMA (Degussa company). 1887 g of the ACQ quartz sand product to be used in accordance with the invention are added to this "prepolymer syrup". 16 g of a conventional peroxidic initiator (bis-t-butyl-cyclohexyl)-peroxodicarbonate) are added to this. As described in connection with formulation a), the composition is cured between two glass plates in a water bath at 60° C. The spacing of the glass plates from one another and the curing time are the same as with the above formulation.

The color test values are determined as described above, with the sample with the cristobalite sand being used as reference quantity for the color tinge s according to German industrial standard 55980. The results are given in Table II. The whiteness of the sample obtained with ACQ is not exactly the same as the whiteness of the α-cristobalite reference sample, but small amounts of a conventional white pigment such as, for example, TiO₂ (e.g. 2200 type of the Kronos Titan company, Leverkusen) are already sufficient to achieve the desired whiteness.

A sample with Dorfner quartz as filler was also produced, in this case, in accordance with formulation b). Two different fractions of the Dorfner quartz with different granulation were used, the first fraction representing the white ⅛ type with a granulation of between 300 and 800 μm and coated with a white pigment bound into an inorganic binder (available from the Gebrüder Dorfner company, Hirschau, Germany). The measured color values are listed in Table II.

Furthermore, the ⅔ type with a granulation of 200 to 500 μm, coated with a white pigment bound into an inorganic binder (manufactured by the Gebrüder Dorfner company, Hirschau/Germany) was used, and the color values determined are again listed in Table II. Both Dorfner quartz samples have in common that they exhibit an orangey tinge which is very distinct although the grains are already coated in both cases with a white pigment bound into an inorganic binder.

The ACQ quartz sand product to be used in accordance with the invention, on the other hand, produces only a low gray value, and, what is more, without the quartz sand product having to be coated with a white pigment bound into an inorganic binder. The white pigment additions referred to above such as, e.g. $TiO_2$, are only to be added to the casting composition, which can be carried out very easily during the mixing of the casting composition.

With the Dorfner quartz samples, the color tinge cannot be eliminated using commercially available white pigments, and so these samples always exhibit a red tinge. "White" molded articles within the meaning of the invention are not obtainable with this quartz product.

With the ACQ quartz sand products according to the invention, mixtures with a filler content of up to 75% by weight and more are readily possible in the casting composition, and these casting compositions can still be very readily filled into conventional molds such as, e.g., for the manufacture of kitchen sinks.

Surprisingly, it was found that when the quartz sand product to be used in accordance with the invention is used as filler, without any considerable impairment of the characteristics of the casting composition, part of the filler, more specifically, up to 50% by volume of the filler, can consist of α-cristobalite, without those characteristics of the casting composition which in accordance with the invention are positive being eliminated. However, casting composition mixtures are preferred in which the proportion of the filler in the mixture contains distinctly less than 50% by volume α-cristobalite sand, typically between 10 and 30% by volume, with between 10 and 20% by volume being especially preferred.

A 50:50 mixture (vol./vol.) of cristobalite sand and inventive quartz sand product also results, with a very high filler content of this filler mixture of 73% by weight in a plastic dispersion, as indicated above in formulations a) and b), in only a viscosity of initially 54 Pa*s, which in the course of 72 hours, i.e., over a period of 2½ days, only rises to 68 Pa*s and thus still remains readily workable.

The following syrup formulations were used to illustrate the viscosity effect of the various types of filler:

200 PMMA are dissolved, as above with formulations a) and b), 800 g MMA (=prepolymer syrup). This syrup is set at a viscosity of 130 mpa*s by adding further MMA. The viscosity is measured with a VT 500 type apparatus of the Haake company, Karlsruhe, Germany, using the MV-DIN rotary body with an immersion tube at measurement level 5.

The fillers and filler contents indicated in the Table are added to this prepolymer syrup and stirred well. The viscosity measurements are then repeated, as described above, at the times indicated in the Table. In the examples, the following volume contents were used in the casting composition: 42% by volume filler content in the casting composition, which corresponds to a volume content of 47% by volume in the cured molded article. This change in volume content reflects the shrinkage which occurs due to the polymerization reaction of the monomer. The density of the prepolymer syrup is approximately 1.0, the density of the cured polymer approximately 1.2. The density of cristobalite is 2.3 and the density of quartz 2.6.

Amounts added:

M72 cristobalite: 1670 g; 42% volume content (62% by weight filler content)

ACQ quartz sand product: 1887 g; 42% volume content (65% by weight filler content)

M72/ACQ (50:50): 1778 g; 42% volume content (64% by weight filler content)

With volume contents in the casting composition of 50%, a corresponding volume content of 55% is obtained in the cured molded article. For these samples, the following amounts were added:

M72: 2330 g; 50% volume content (69% by weight filler content)

ACQ: 2637 g; 50% volume content (72% by weight filler content)

M72/ACQ (50:50): 2485 g; 50% volume content (71% by weight filler content).

With volume contents in the casting composition of 53%, a corresponding volume content of the filler of 58% is obtained in the cured molded article. The following amounts were added to the syrup:

M72: 2500 g; 53% volume content (72% by weight filler content)

ACQ quartz sand product: 2950 g; 53% volume content (75% by weight filler content)

M72/ACQ (50:50): 2725 g; 53% volume content (73% by weight filler content)

TABLE III

| Sample | Volume content | immediately | 1 h | 4 h | 72 h |
| --- | --- | --- | --- | --- | --- |
| M 72 | 42 | 15.7 | 20 | 23 | 38 |
| ACQ | 42 | 15.2 | 15.2 | 15.4 | 15.8 |
| M72/ACQ | 42 | 15.6 | 18 | 20 | 23 |
| ACQ | 50 | 21 | 22 | 22 | 23 |
| M72/ACQ | 50 | 23 | 27 | 31 | 38 |
| M72 | 50 | 33 | 43 | 50 | — |
| ACQ | 53 | 38 | 38 | 40 | 42 |
| M72 | 53 | 72 | 88 | — | — |
| M72/ACQ | 53 | 54 | 58 | 62 | 68 |

The evaluation of the test data listed in Table III results in the following:

1. The viscosity in the ACQ sample remains constant over quite a long time.
2. The viscosity with M72 filler increases over quite a long time and very strongly and so higher volume contents lead to casting compositions which are no longer workable.
3. The use of the ACQ product makes it possible to produce mixtures with high volume concentrations, also with the addition of M72 (in the examples volume ratio ACQ/M72 50:50).

Characteristics of molded articles manufactured using the casting composition according to the invention The following procedure was carried out to test the resistance of such molded articles to stains: 200 g TRIM were added as cross-linker (source of supply: Degussa company) to 7.8 kg MMA and 2 kg PMMA (source of supply in both cases as above). 10 g of a conventional mold release agent (e.g. stearic acid of the Merck company, Germany) and 16.7 kg M72 filler and 18.9 kg ACQ, both silanized in the usual way, were added. Finally, 150 g of a conventional peroxidic initiator, e.g. bis-t-butyl-(cyclohexyl)-peroxodicarbonate were used (e.g. BCHPC type of the Peroxidchemie company, Höllriegelskreuth, Germany). A molded article was cast in the usual way from these syrups, and a sample of the size 10×10 cm was cut out of the basin bottom of the thus obtained molded article. The thickness of the sample was approximately 1 cm.

Common household abrasion was simulated by the samples being subjected to grinding (sample size 50×50 mm from the basin bottom sample part). A commercially available grinding and polishing machine was used to do this; the sample was loaded with a weight of 15 kg; the LS 9 Loh emery material of the Loh company in 35573 Wetzlar, Germany, was used as grinding material. The grinding operation was continued for approximately 10 minutes, after which time approximately 0.2 to 0.3 cm were removed from the sample.

The sample was then acted upon with a new, commercially available felt pen (Edding 3000 of the Edding AG company, color No. 1), and the color was allowed to dry for 60 minutes. Wiping with a soft cloth and cleaning alcohol (ethanol) was then carried out (10 wiping operations, with a new cloth being used after 5 wiping operations). The sample was assessed visually and under the microscope. The aim was to get back a surface which is as stain-free as possible.

The number of black stains visible under the microscope (6.5 magnification factor) was, therefore, determined.

The results are as follows:

M72-filled sample:

Visual assessment: intensive graying of the sample in the area acted upon with the felt pen.
Microscopy:
Number of stains: approximately 90 per surface unit. Visual assessment under the microscope: The stains are located in the region of the filler which can obviously absorb dye from the felt pen.
ACO filler:
Visual assessment: relatively little graying of the sample in the area of the felt pen application.
Microscopy: 6 stains
Visual assessment under the microscope: The stains occur where filler particles were torn out by the grinding and small recesses were formed. The filler is not seen to take on color.

An alternate hot/cold stress test was also carried out on the samples.

For this purpose, sinks manufactured in each respective case in accordance with the above formulation were acted upon for approximately 3 minutes with 15° C. cold water at a flow rate of 3 l/min on the basin bottom of the sink; immediately afterwards, 90° C. hot water was directed for 3 minutes at a flow rate of 3 l/min at the same place in the basin bottom of the sink. In each respective case, the water was allowed to flow off directly through the sink outlet. This corresponds to one cycle. The number of cycles until a clearly visible crack occurs in the basin bottom was evaluated. The results are as follows:

M72 sample: 800 cycles

M72/ACQ sample: 2700 cycles

ACQ sample: 4200 cycles.

The good resistance to cracks is due to the essentially smooth grain shape without any cracks. The cracks occurring with unsuitable fillers obviously lead in addition to the increased absorption of binder to a preset breaking point and so cracks can occur much earlier.

We claim:

1. Casting composition for producing white molded articles comprising a curable syrup which contains a liquid monomer and optionally prepolymer components dissolved therein, and an inorganic filler, characterized in that the inorganic filler includes a quartz sand product, the individual grain of which consists in the core essentially of quartz and at the surface essentially of α-cristobalite.

2. Casting composition as defined in claim 1, characterized in that the proportion of the α-cristobalite in the total grain is on average approximately 1 to approximately 25% by weight.

3. Casting composition as defined in claim 2, characterized in that the proportion of the α-cristobalite in the total grain is on average approximately 3 to approximately 15% by weight, in particular approximately 10% by weight.

4. Casting composition as defined in claim 1, characterized in that the grain surface is substantially intact and smooth.

5. Casting composition as defined in one of claim 1, characterized in that the grain shape of the quartz sand product is an essentially unbroken grain shape.

6. Casting composition as defined in claim 1, characterized in that the quartz sand product has a grain size distribution with predominance in the range of 100 μm to 500 μm.

7. Casting composition as defined in claim 1, characterized in that the quartz sand product has a whiteness L>60, measured in accordance with German industrial standard 55981.

8. Casting composition as defined in claim 1, characterized in that the quartz sand product has as a-value the absolute value <0.6, preferably <0.2, measured in accordance with German industrial standard 55981.

9. Casting composition as defined in claim 7, characterized in that the b-value has an absolute value of <2, preferably <1.2, measured in accordance with German industrial standard 55981.

10. Casting composition as defined in claim 1, characterized in that the grain of the quartz sand product is silanized.

11. Casting composition as defined in claim 1, characterized in that the quartz sand product obtained by partial conversion of quartz sand is only converted to such a degree that the capillary and pore volume accessible from outside remains limited to a value which corresponds to a water absorption of 40 g per 100 g quartz sand product or less.

12. Casting composition as defined in claim 1, characterized in that the inorganic filler has a proportion of 40 to 90% by weight of the composition.

13. Casting composition as defined in claim 12, characterized in that the inorganic filler consists at least to 50% by volume of a quartz sand product.

14. Casting composition as defined in claim 1, characterized in that the inorganic filler consists essentially of the quartz sand product.

15. Molded article, produced using a casting composition as defined in claim 1.

16. Molded article as defined in claim 15, characterized in that the molded article is a kitchen sink, a counter-top for the kitchen or bathroom or sanitary ware.

* * * * *

UNITED STATES PATENT AND TRADEMARK OFFICE
CERTIFICATE OF CORRECTION

PATENT NO : 5,753,741          Page 1 of 2

DATED     : May 19, 1998

INVENTOR(S): Stephan HARKE et al.

It is certified that error appears in the above-identified patent and that said Letters Patent is hereby corrected as shown below:

Claim 3, line 4, delete ", in particular approximately 10% by weight".

Claim 8, line 2, replace "the" with --an--.

Claim 8, line 3, delete ", preferably < 0.2,".

Claim 9, line 2, after "the" insert --quartz sand product has as--.

Claim 9, line 2, after "b-value" delete "has".

Claim 9, line 2, after "absolute value" delete "of".

Claim 9, line 3, delete ", preferably < 1.2,".

Add new claims as follows:

17. Casting composition as defined in claim 3 wherein the proportion of the $\alpha$-cristobalite in the total grain is on average approximately 10% by weight.

UNITED STATES PATENT AND TRADEMARK OFFICE
CERTIFICATE OF CORRECTION

PATENT NO : 5,753,741

DATED : May 19, 1998

INVENTOR(S): Stephan HARKE et al.

It is certified that error appears in the above-identified patent and that said Letters Patent is hereby corrected as shown below:

18. Casting composition as defined in claim 8 wherein the quartz sand product has as the a-value the absolute value of ≤ 0.2.

19. Casting composition as defined in claim 9 wherein the quartz sand product has as the b-value the absolute value ≤ 1.2.

Signed and Sealed this

Twenty-eighth Day of December, 1999

Attest:

Q. TODD DICKINSON

*Attesting Officer*     *Acting Commissioner of Patents and Trademarks*